G. B. RAIT.
LOCOMOTIVE.
APPLICATION FILED SEPT. 22, 1909.
996,031.
Patented June 20, 1911.
6 SHEETS—SHEET 3.
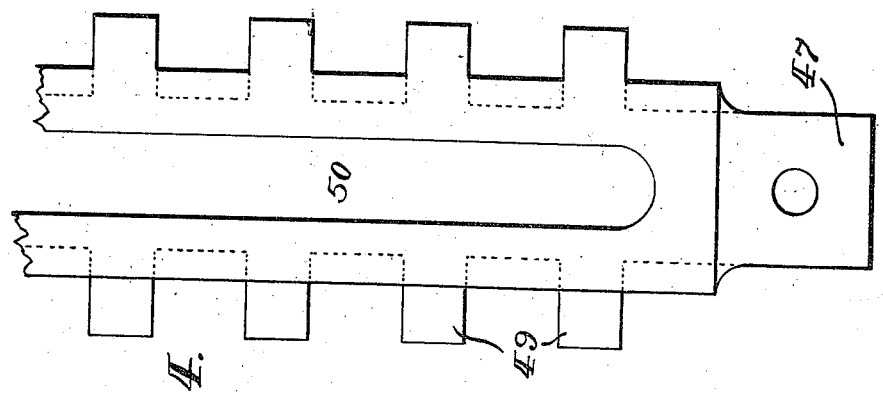
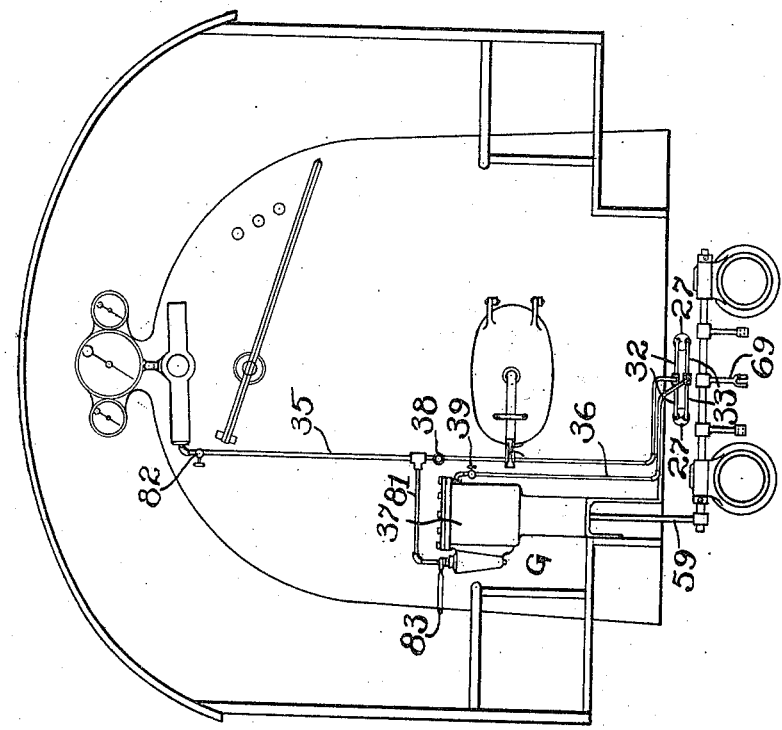
Witnesses:
Jule Donovan.
H. L. Fischer
Inventor:
George B. Rait,
by: J. C. Bradbury
Attorney.

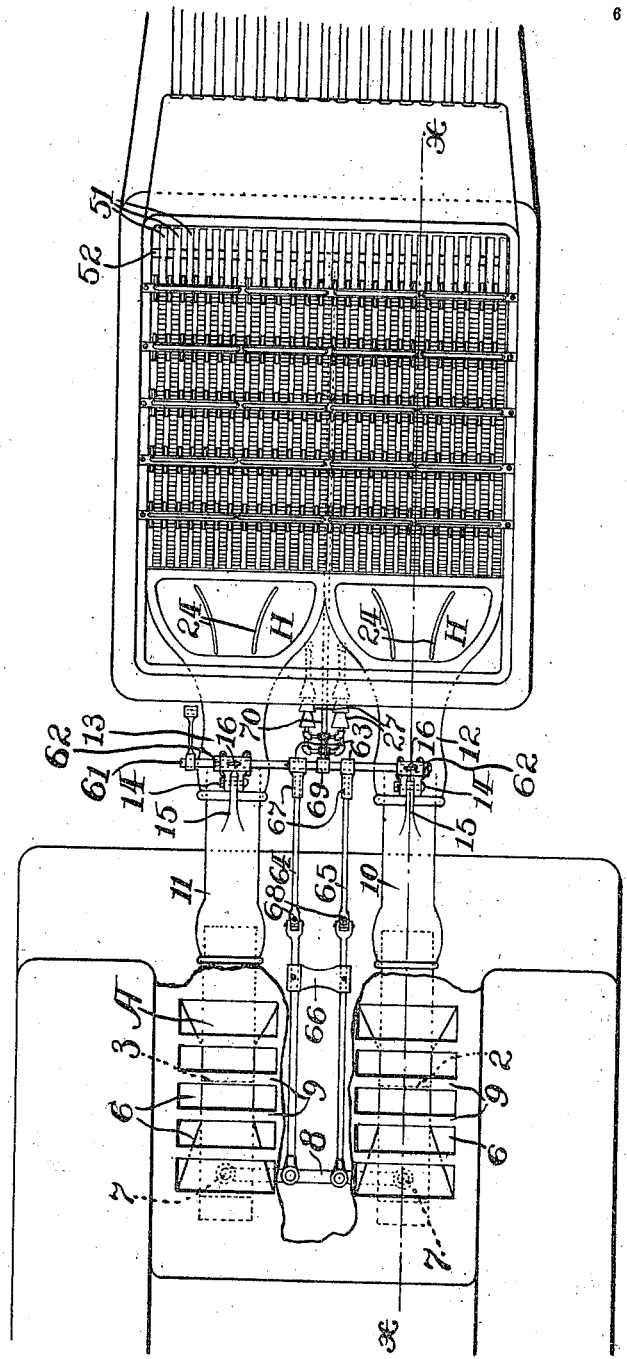

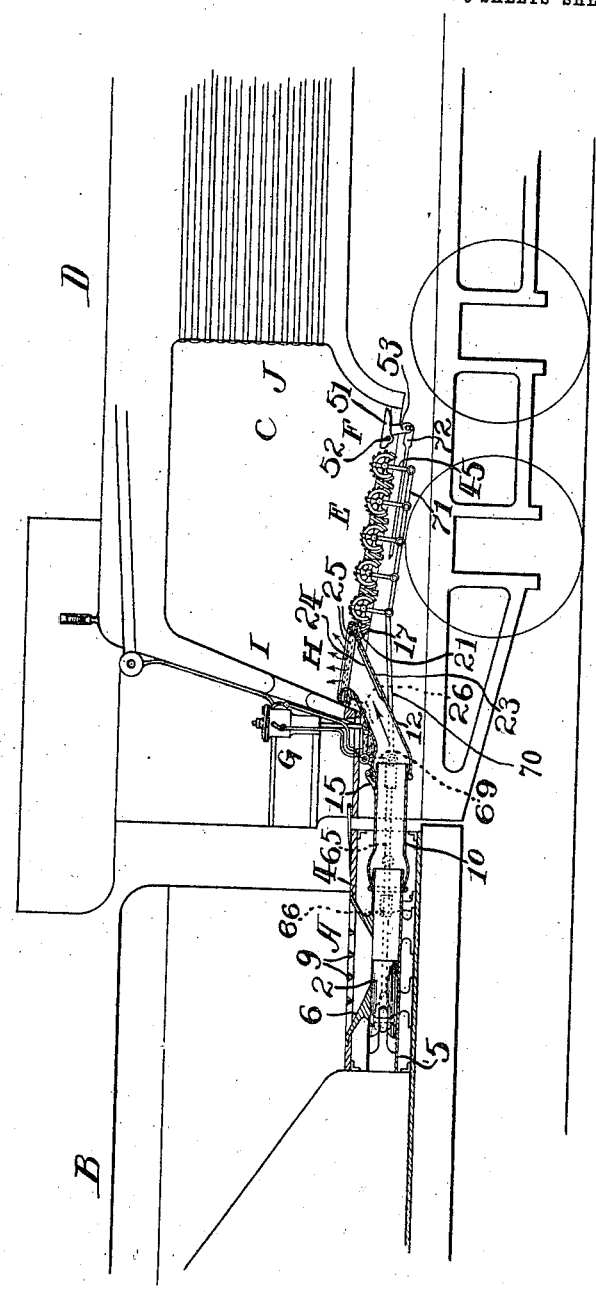

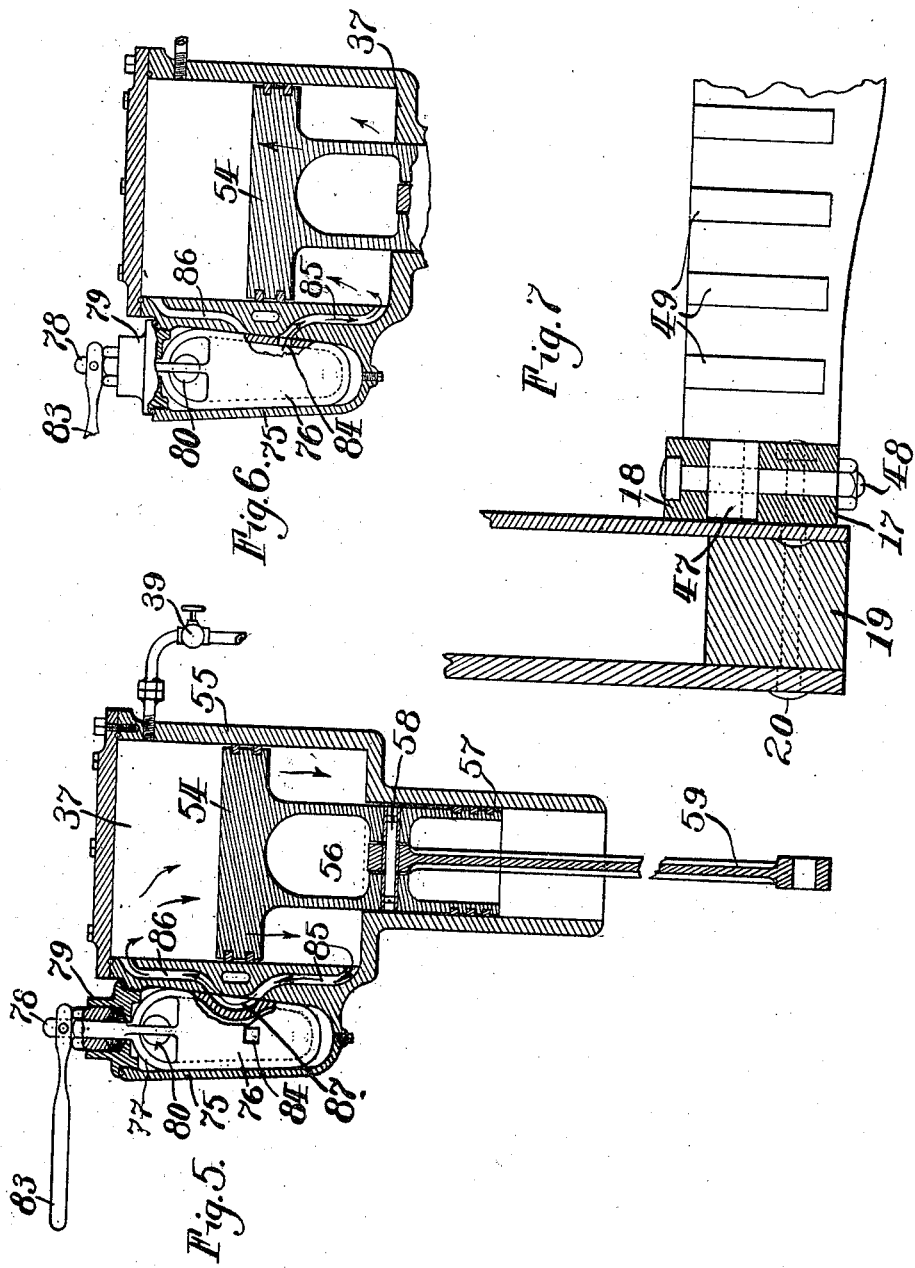

G. B. RAIT.
LOCOMOTIVE.
APPLICATION FILED SEPT. 22, 1909.
996,031.
Patented June 20, 1911.
6 SHEETS—SHEET 5.
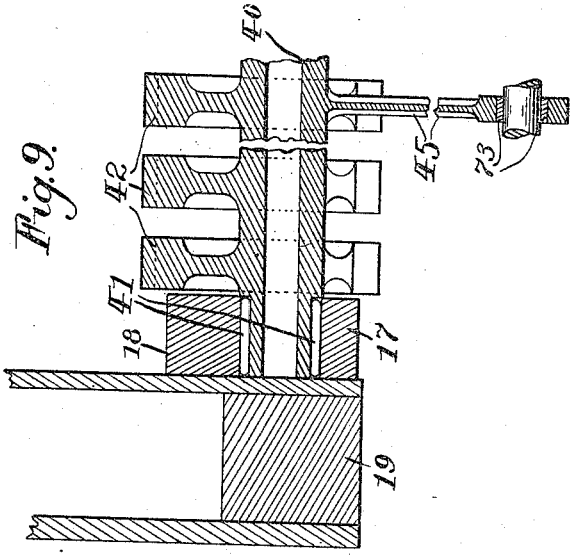
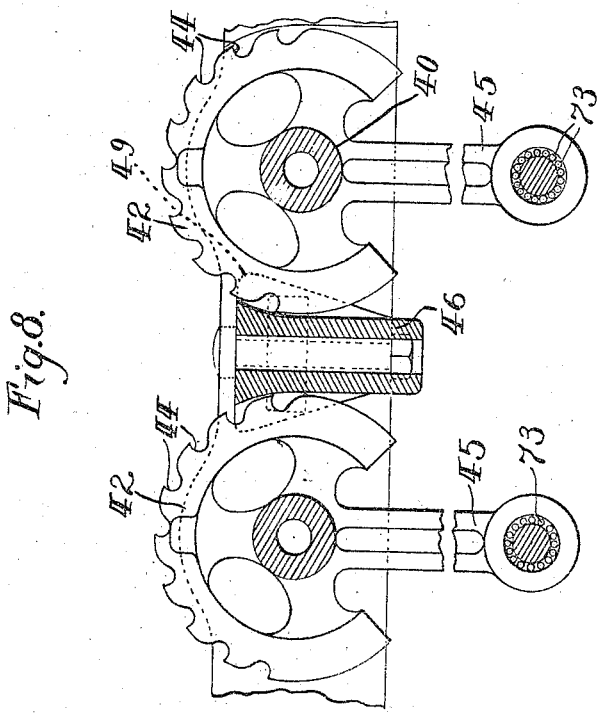
Witnesses:
Inventor:
George B. Rait,
by: Attorney

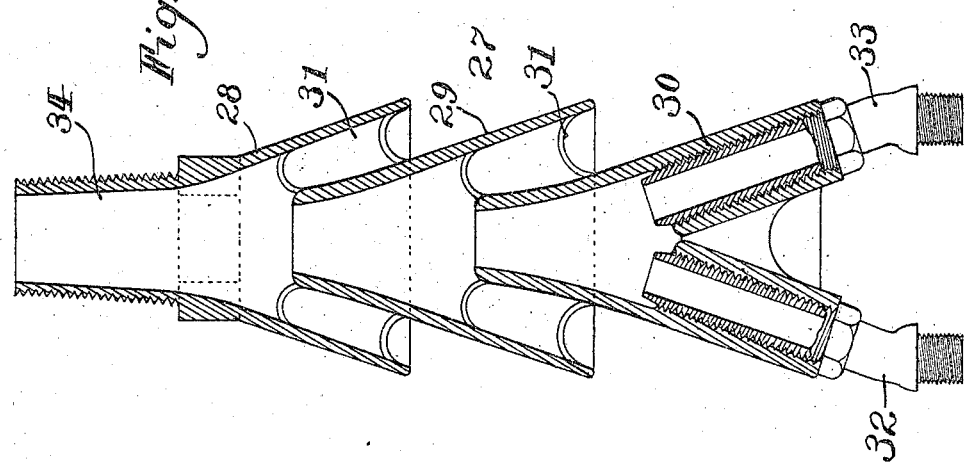
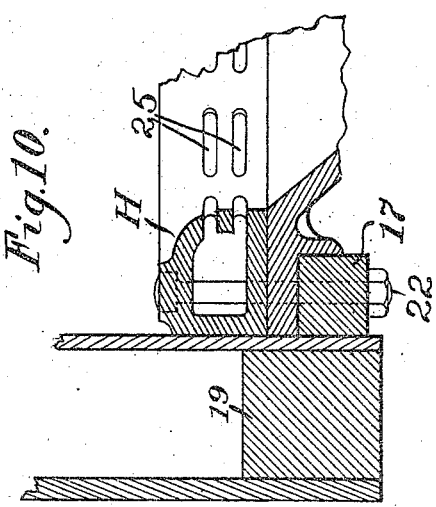

UNITED STATES PATENT OFFICE.

GEORGE B. RAIT, OF MINNEAPOLIS, MINNESOTA.

LOCOMOTIVE.

996,031.

Specification of Letters Patent. Patented June 20, 1911.

Application filed September 22, 1909. Serial No. 518,971.

*To all whom it may concern:*

Be it known that I, GEORGE B. RAIT, a citizen of the United States, residing at Minneapolis, in the county of Hennepin and State of Minnesota, have invented a new and useful Improvement in Locomotives, of which the following is a specification.

My invention relates to improvements in locomotives and more particularly has to do with mechanical stoking mechanism as applied to its fire box.

The need of means for mechanically stoking in connection with locomotives has long been felt and the production of successful apparatus for accomplishing this result has long been sought but up to the time of this invention has not been accomplished. The solution has not been easy owing to the many actual requirements. Among these requirements are, that the device shall be very compact so as to be placed within the limited space available in the cab of the locomotive and in front of the coal boards on the tender and still leave space for the free movement of the engine crew; that it must be readily detached and put out of service so that in case of failure, hand firing may be resorted to at once without disabling the engine or delaying the train; that it must be free from complications of construction so that it may be easily manipulated and repaired by the men usually available for that class of work; that it must be of substantial construction so as to withstand rough usage without failure; that it must permit of free access to the fire for cleaning and inspection; that it must be designed so as not to impede the boiler makers in gaining access to the fire box; that it must effect an even distribution of coal over the whole surface of the grate and be able to handle all grades, and, that it must do its work so as to maintain the working pressure through all variations of surface regardless of demands that may be made upon the boiler and do it with an evaporative efficiency of the coal at least equal to hand firing. These requirements are essential and are accomplished by my invention which enables the fireman to manipulate the device without leaving his seat and by very little hand labor allowing him while the locomotive is in motion to watch ahead for signals and thus reduce danger in the operation of the train.
In addition to the above my invention accomplishes results and embodies features of construction which will be more particularly pointed out in the following specification and claims.

In the accompanying drawings forming 60 part of this specification, Figure 1 is a plan view partly in section of part of a locomotive and its furnace and a detail of the tender showing my improvement applied thereto; Fig. 2 is an elevation taken in section upon the line X—X of Fig. 1; Fig. 3 is an elevation looking into the locomotive cab showing parts of my invention applied thereto; Fig. 4 is a plan of a detail of one of the stationary grate bars with teeth; Fig. 5 is a side elevation in section of the engine and its coöperating parts for reciprocating the plungers of the coking mechanism and the rocking and dump grates; Fig. 6 is a detail view in section similar to a portion of the construction illustrated in Fig. 5 showing the master valve in position when live steam is permitted to pass into the cylinder of the engine; Fig. 7 is an elevation of a detail of a stationary grate bar showing the means by which it is secured to the support at the side of the fire box; Fig. 8 is a side elevation of a detail of two of the rocking grates with one of the stationary grates between them; Fig. 9 is an end elevation of a detail of the rocking grates; Fig. 10 is a cross section of a detail of one of the twyers illustrating the manner in which it and the coking chambers are secured to the side supporting frames of the fire box, and Fig. 11 is a plan in section of one of the air injectors used with my invention.

In a general way my invention includes under-feed mechanism adapted to carry the fuel from the tender up under and into the fire box of the locomotive, the fuel being formed substantially into a stream which overflows on to a main grate placed back of the outlet of the feed mechanism. The fuel overflowing on to the main grate is advanced as it is being consumed until the remaining ashes, clinkers and other refuse are caught upon a dump grate which is placed back of the main grate and by which they are deposited in the usual pit below. The fuel is thus moved slowly in a steady stream from the tender over the entire grate area. The feeding and grate mechanism are power driven a single unit being employed for that purpose although this feature is subject to modification and more than one unit employed and part of the mechanism operated by hand when desired. The power unit referred to also has special features of invention which will be hereinafter pointed out. The apparatus also includes the supply of a blast of air or steam or both to the coal at the outlet of the coking chamber, immediately before it passes on to the main grate. This blast is furnished for the primary purpose of aiding in the coking operation.

In the drawings A represents the feed mechanism, B a portion of the tender, D a portion of the locomotive, C the fire box in the locomotive, E the main grate, F the dump grate, G the actuating mechanism for operating the driven parts of my invention and H the twyers for introducing a blast of air or steam into the fire box or coking chamber and aiding in the operating of coking and combustion.

Throughout the following specification and claims, where the front and back portions of the fire box are referred to, I mean the parts marked respectively I and J in Fig. 2 of the drawings.

*Feed mechanism.*—The feed mechanism consists of one or more devices two being illustrated in the drawings and consisting of a pair of plungers 2 and 3 which are reciprocated parallel to each other and longitudinally in the coal space of the tender out of the way under the deck 4 thereof. These plungers are cylindrical in form and each slides back and forth in a cylindrical casing 5. Above the casing of each plunger and opening into the deck of the tender is a hopper 6 which is adapted to feed the coal from the tender into the casings 5 in front of the plungers 2 and 3 so that when said plungers are propelled forwardly and backwardly the coal received from the hoppers is forced forwardly toward the locomotive. The back ends of the plungers have loosely connected thereto by means of pivots 7 a transverse draw bar 8 which in turn is connected with the actuating mechanism to be hereinafter described. Placed over the entrance into each hopper is a grating 9 which serves to prevent too large pieces of coal entering the cylindrical casings 5 which might clog or tend to clog the apparatus. The cylindrical casings 5 lead forwardly through loosely joined sections of pipes 10 and 11 into upwardly inclined ducts or coking chambers 12 and 13 which connect across the front of the fire box above the grate E. The lower end of each coking chamber is slightly enlarged to receive the forward end of the corresponding section of said pipes and the rearward ends of the pipes 10 and 11 are enlarged to receive the corresponding ends of the casings 5. This method of joining the sections of pipes 10 and 11 to the coking chambers and casings 5 produces slip joints between said members and sufficient universal action to compensate for the motion between the tender and locomotive. The forward ends of the pipes 10 and 11 are secured to the coking chambers by means of bolts 14 passing through overlapping lugs 15 and 16 which are carried respectively upon the pipes 10 and 11 and coking chambers 12 and 13.

A supporting frame is placed in the fire box which is made in upper and lower sections 17 and 18, the lower section thereof being secured to the mud ring 19 of the locomotive by bolts 20 or other suitable means. The upper and inner ends of the coking chambers are formed with shoulders 21 resting upon the lower section 17 of the supporting frame. Bolts 22 passing through the shoulders 21 of the coking chambers, twyers H and lower section 17 of the supporting frame serve to assist in holding said parts together. The coking chambers slant upwardly into the fire box and their upper ends extend across the front of the fire-box so that the coal is fed evenly over the grate. The floors 23 of said chambers are provided with deflectors 24 curving upwardly apart which assist in spreading the coal evenly upon the grate area. The course of the coal traveling from the tender into the fire box is first in substantially a horizontal direction and then upwardly at an incline into the fire box and onto the grate. It travels in a substantially direct line from the tender to the dump grate and thus requires less power to move it than in prior devices.

*Twyers.*—The twyers are employed to introduce a blast of air or steam or both into the coal and thus assist in the operation of coking and burning. A twyer is placed over each coking chamber and consists of a hollow nozzle declining backwardly in the fire box and placed around the outlet of the duct. Each twyer is secured to the wall of the coking chamber on which it is mounted by means of bolts 22 above mentioned and has its inner wall formed with perforations 25 which are adapted to inject jets of air, steam or a mixture of both directly across the orifice of the coking chamber into the coal which is coking therein. Each twyer is connected by means of a pipe 26 with an air injector 27 from which an air blast is received. The air injectors employed may be of any suitable form, the construction shown being one that is adapted for use with live and exhaust steam. This construction consists of a plurality of superimposed integral nozzles 28, 29 and 30 which are provided with forwardly converging air inlets 31. The nozzle 30 has connected therewith a live steam supply pipe 32 and an exhaust steam supply pipe 33, their inlets converging forwardly, so as to project the air admitted through the ports 31 out of the forward end 34 of the injector. In this manner a certain amount of steam is mixed with air and the mixture so formed is injected in the form of a blast into the coal in the fire box. The live and exhaust steam pipes are connected in multiple as shown in Fig. 3 and the live steam connection is coupled to a main supply pipe 35 leading into the boiler head and the exhaust steam connection 33 coupled to a supply pipe 36 leading to the exhaust port of the engine 37 forming part of the actuating mechanism G to be hereinafter described. The pipe 35 is provided with a valve 38, and the pipe 36 with a valve 39 by which the supply of live or exhaust steam can be shut off or opened. It will be noted that the twyers entirely surround the entrances for the coal into the fire box and that by locating the perforations entirely around said entrances in the inner walls of the twyers, the blast is thoroughly mixed with the coal, and the coal is more evenly coked in the coking chamber than in prior devices where the twyers do not completely surround the coking chambers. The twyers can be easily removed to make repairs or replaced inexpensively by detaching the bolts 22. By declining the twyers backwardly as stated the coal is more evenly and effectively distributed and passed onwardly over the grate.

*Main grate.*—The main grate is composed of a plurality of substantially hollow horizontal shafts or gudgeons 40 the ends of which are journaled by means of roller bearings 41 between the sides of the lower and upper supporting frames 17 and 18. These shafts are arranged transversely in the fire box and each shaft is formed with a plurality of partly circular crowns 42 which are arranged parallel to each other in substantially vertical planes. The crowns 42 are serrated to form ratchet teeth 43 the abrupt shoulders 44 of which face toward the inner end of the fire box, so that when the shafts 40 are oscillated, the coal which is not consumed during the coking process is advanced upon the grate toward the inner end of the fire box. Each shaft 40 is formed with a depending arm 45 by which it is adapted to be rocked. The crowns on each shaft are spaced apart and between each pair of crowns on adjacent shafts, is placed a stationary grate bar 46 the ends of which are formed with lugs such as illustrated at 47 in Fig. 4. These lugs are held between the upper and lower sections of the supporting frames 17 and 18, a bolt 48 being passed through said upper and lower sections and the lugs 47 to assist in securing said parts together. Each stationary grate bar 46 is provided with a number of teeth 49 which fit loosely between the crowns of the rocking grates. This construction serves to cut up all or nearly all of the clinkers and keeps said rocking grates clean at all times. The central portion of each stationary grate is formed with an opening 50 which admits air to the burning coal and assists in allowing the ashes and clinkers to drop through the grate.

*Dump grates.*—At the inner end of the fire box is placed a dump grate which consists of a number of longitudinal grate bars 51 mounted upon a shaft 52 journaled between the upper and lower sections 17 and 18 of the supporting frame. The dump grate shaft carries a depending arm 53 by which the grate may be turned down to deposit the refuse from the fire into the ash pan below. The general assemblage of the main grate, the dump grate, supporting frame in the fire place and twyers is at a substantially declining angle toward the back of the fire box so that the coal is forced up through the coking chambers and runs on to the main grate and from the main grate is moved downwardly toward the back of the fire box and the refuse received upon the dump grate. An advantage of this mechanism is being able to burn low grade coal or refuse, coking the same in the coking chambers and pushing the coked coal and clinkers forward upon the rocking grates, getting rid of the clinkers, keeping the grates clean at all times and allowing the free passageway of air through the bed of coals.

*Actuating mechanism.*—Located upon the boiler head of the locomotive is a steam engine 37 which as illustrated is arranged with a differential piston 54 working vertically in a cylinder 55. On the lower side of the piston 54 is a depending hollow cylindrical stem 56 which slides in the depending sleeve 57. Pivoted upon the pin 58 in the stem is the connecting rod 59 which has its outer end journaled to the free end of a crank arm 60, said crank arm being rigidly secured to a shaft 61. The shaft 61 is journaled in the lugs 16 on the lower ends of the ducts or coking chambers and is held in place by the removable collars 62. The shaft 61 carries a pair of depending arms 63 to the lower ends of which are journaled a pair of sectional connecting rods 64 and 65. These connecting rods work through a guide 66 on the tender and are pivoted to the draw bar 8 for reciprocating the plungers 2 and 3. Turn buckles 67 are interposed between the ends of the connecting rods 64 and 65 and the arms 63 so that they may be adjusted in length as desired to compensate for change of distance between the tender and locomotive. Universal joints 68 are further inserted between the sections of each connecting rod to allow for variations in movement between the tender and locomotive. Between the depending arms 63 is another arm 69 which is rigidly mounted upon the shaft 61 and has its free end journaled to a connecting rod 70 for operating the rocker grates. The depending arms 45 from the rocker grates are connected by link 71 to the end of the connecting rod 70. The depending rocker arm 53 is also operated by a thrust rod a portion 72 thereof being shown by which the dump grate F may be operated in the usual manner when desired from the cab. Roller bearings 73 may be employed between the joints. These bearings as well as those between the shafts of the rocker grates and the supporting frames on which the rocker grates are journaled, are used to reduce friction between moving parts which are not easily oiled or otherwise lubricated. When the piston 54 rises the shaft 61 is turned, the plungers move forward and the rocker grates and dump grate turn back and when said piston descends, the action of said parts is reversed. It is not necessary to operate the dump grate in the manner described for it can be operated in any manner.

On the side of the cylinder 55 is a master valve 75 the casing of which is cast integral with the cylinder of the engine. This valve has a hollow plug 76 the upper end of which is a skeleton frame 77 carrying a valve stem 78 by which said valve is adapted to be turned. The valve casing is closed in the usual manner by the threaded cap 79 through which the stem 78 passes. Live steam is admitted into the valve chamber through the opening 80, in its wall leading with a branch pipe 81 which connects with the main steam supply pipe 35. A valve 82 in the pipe 35 next to the boiler head is employed for controlling the supply of live steam through said pipe. A handle 83 mounted upon the valve stem 78 is for use by the fireman to manipulate the valve and control the operation of the engine. In the wall of the valve plugs 76 is a port 84 which is adapted to communicate through the steam passageway 85 leading through the wall of the cylinder to its lower end thus admitting live steam below the piston and forcing it up in the cylinder. In Fig. 6 the valve is shown in position with the port 84 in communication with the passageway 85 as described. Communicating with the upper end of the cylinder is another passageway 86 through the wall thereof with which the port 84 does not at any time connect. A port passageway 87 not passing through the wall of the valve plug and having no connection with the port 84 is adapted to register with the passageways 85 and 86 to bring them into communication. Thus when the valve plug is turned after the piston is in superior position communication is established between the ends of the cylinder on opposite sides of the piston which causes the steam remaining below the cylinder to pass into the upper end thereof and force the piston down, the area or active head of the piston being greater on its upper than on its lower side. The position of the parts when the valve 75 forms a communication between the upper and lower ends of the cylinder, is illustrated in Fig., 5. It will be understood that the valve 39 allows the exhaust steam to escape from the cylinder slowly to produce the return movement of the piston under pressure of exhaust steam as stated. It is not necessary to operate the engine by the master valve described for it can be controlled by the usual valve mechanism or as desired within the scope of my invention.

*Operation.*—In operation the valve 75 is turned by the handle 83 with its port 84 registering with the passageway 85. Live steam is thus admitted into the cylinder 55 and the differential piston 54 forced up thus moving the plungers 2 and 3 forward and forcing a charge of coal through the feed mechanism into the coking chamber. The coal which has been coking in the coking chamber flows over on to the grate E. The valve 75 is thus closed and the port passageway 87 thrown into communication with the passageways 85 and 86. The steam then remaining in the cylinder forces the piston down and gradually escapes through the valve 39 into the air injectors 27. During this operation the plungers 2 and 3 are returned in readiness for another charge of coal and the rocker grates are turned forwardly and downwardly and the coked coal moved toward the inner end of the fire chamber, the refuse on the dump grate being deposited below off of the dump grate when desired. Should anything go wrong with the device, hand firing can be resorted to at once as the machinery for operating the stoker is all under the foot boards of the tender and locomotive out of the way. Should anything happen to the plungers, they can be uncoupled and hand firing used by bank firing on the coking chambers and the rocking grates operated by the piston as usual, air or steam being used to blow the fire as before. As a last resort hand firing can be used over the entire grate. Thus a large range of ways is provided should anything go wrong.

It is obvious that the steam blower in the smoke box of the locomotive can be dispensed with by the use of my device as the fire can be forced better through the twyers on the coking chamber.

My invention allows the use of a larger exhaust nozzle on the locomotive and consequently less back pressure on the locomotive cylinders is produced. Further by the use of my invention the fire door can be kept closed all of the time keeping the cold air from rushing in and causing leaky boiler tubes. The combustion of the fuel takes place principally on the coking chambers where the fire is forced and the gases are then thoroughly mixed and consumed before leaving the fire box. This insures a smokless fire most of the time.

This invention permits of various modifications and it is not necessary to employ all of the parts described in order to accomplish the results attained.

In accordance with the patent statutes I have described the principles of operation of my invention together with the apparatus which I now consider to represent the best embodiment thereof but I desire to have it understood that the construction shown is only illustrative and that the invention can be carried out by other means and applied to uses other than those above set forth within the scope of the following claims.

Having described my invention, what I claim as new and desire to protect by Letters Patent is:—

1. In combination with a locomotive and its fire box and tender, underfeed mechanism consisting of a hopper on the tender having a longitudinal passageway connected below the same, a reciprocating plunger within said passageway adapted to advance the fuel received from the hopper, a coking duct mounted upon the locomotive and extending upwardly under and into the front part of the fire box, a pipe between said passageway and coking duct freely joined thereto to permit substantially universal movement, a twyer in the form of an endless tube detachably secured to said duct about its discharge end in the fire box, means for supplying a blast to said twyer, a main grate in said fire box onto which a stream of fuel overflows from said duct through said twyer, said main grate being composed of a plurality of bars with circular crowns, said crowns being serrated to advance the fuel received from said duct, a dump grate back of said main grate and an engine having operative connection with said plunger and main grate, for the purposes specified.

2. In combination with a locomotive and its fire box and tender, underfeed mechanism extending from said tender up into the front of said fire box having a coking duct at its upper end, a twyer in the form of a rearwardly declining hollow annular ring detachably secured to said coking duct about its discharge end in said fire box, a grate back of the outlet of said under feed mechanism onto which the fuel is advanced by said mechanism, said grate being composed of a number of crowned rocker elements adapted to advance the fuel in the fire box after it is received from said underfeed mechanism and means for simultaneously operating said underfeed mechanism and rocker elements.

3. In combination with a locomotive and its fire box, boiler and tender, underfeed mechanism extending into the fire box, having a coking duct at its upper end, a coal hopper on said tender with which said underfeed mechanism coöperates, an engine attached to said underfeed mechanism for operating the same, a valve connection between said engine and boiler, a flexible joint between the parts mounted upon the locomotive and tender, a twyer in the form of a rearwardly declining annular tube separably connected with said duct about its discharge end in said fire box, means for delivering a blast to said twyer and a system of crowned rocker grates lying in a backwardly declining plane in the fire box and having operative connection with said feed devices for advancing the fuel back into said fire box after being discharged from said underfeed mechanism.

4. In combination with a locomotive and its fire box and tender, underfeed mechanism consisting of a hopper on the tender having a longitudinal passageway connected below the same, a reciprocating plunger or plungers within said passageways adapted to advance the fuel received from the hopper, a duct or coking chamber mounted upon the locomotive and extending upwardly under and into the front of the fire box and a connection between said passageway and duct freely joined thereto to permit substantially universal movement, a main grate in said fire box onto which a stream of fuel overflows from said duct, said main grate being composed of a plurality of bars with circular crowns, said crowns being serrated to advance the fuel received from said duct, a dump grate back of said main grate and an engine having operative connection with said plunger and main grate, for the purposes specified.

5. In combination with a locomotive and its fire box and tender, underfeed mechanism consisting of a hopper on the tender having a longitudinal passageway connected below the same, a reciprocating plunger within said passageway adapted to advance the fuel received from the hopper, a duct mounted upon the locomotive and extending upwardly under and into the front part of the fire box, a pipe between said passageway and duct freely joined thereto to permit substantially universal movement, a twyer on the orifice of said duct in the fire box, means for supplying a blast to said twyer, a main grate in said fire box onto which a stream of fuel overflows from said duct through said twyer, said main grate being composed of a plurality of bars with circular crowns, said crowns being serrated to advance the fuel received from said duct, a dump grate back of said main grate and an engine having operative connection with said plunger and main grate, for the purposes specified.

6. In combination with a locomotive and its fire-box and tender, underfeed mechanism extending from said tender up and discharging into the forward end of said firebox and having a coking duct at its upper end, a twyer ring surrounding the opening of said coking chamber and adapted to direct a series of jets inwardly across said opening, means for furnishing a blast to said twyer, a rearwardly declining grate in said firebox and adapted to receive the coked fuel from said coking chamber, said grate being formed of a series of rocker bars having serrated crowns adapted to advance the fuel rearwardly, and means for operating said crowned bars in coöperation with said underfeed.

7. In combination with a locomotive and its fire-box and tender, underfeed mechanism from said tender up into the front of said firebox, having a coking duct at its upper end, a twyer in the form of a rearwardly declining hollow annular ring detachably secured about the discharge end of the duct in said firebox, a feed grate back of the outlet of said underfeed mechanism, onto which the fuel is advanced by said mechanism and operatively connected therewith, and adapted to engage the fuel to advance it progressively toward the rear of the firebox after being received from said mechanism, and means for simultaneously operating said underfeed mechanism and said grate.

In testimony whereof, I have signed my name to this specification, in the presence of two subscribing witnesses.

GEORGE B. RAIT.

Witnesses:
E. E. WHITING,
J. HUNTZICKER.